United States Patent Office 3,194,810
Patented July 13, 1965

3,194,810
PRODUCTION OF N-HYDROXYALKYL SUBSTITUTED OXAZOLIDONES
Robert L. Formaini, Petersburg, and Edwin D. Little, Hopewell, Va., assignors to Allied Chemical Corporation, New York, N.Y., a corporation of New York
No Drawing. Filed Mar. 4, 1960, Ser. No. 12,674
10 Claims. (Cl. 260—307)

This invention relates to the production of N-hydroxyalkyl substituted oxazolidones.

Most of the known procedures for producing N-hydroxyalkyl substituted oxazolidones involve use of relatively expensive reactants. Some of the procedures also require use of expensive pressure equipment; in others, the yield is low due to formation of by-products.

The principal object of this invention is to provide a simple and economical process for producing N-hydroxyalkyl substituted oxazolidones in high yield. Other objects and advantages will be apparent from the following detailed description.

The N-hydroxyalkyl substituted oxazolidones prepared by the process of this invention may be represented graphically by the following general formula:

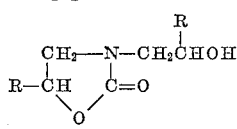

wherein R is a member of the group consisting of hydrogen and alkyl radicals containing 1 to 2 carbon atoms.

U.S. application Serial No. 848,214, filed October 23, 1959, by Edwin D. Little and Bing T. Poon, now U.S. Patent 3,088,948, discloses production of tris-2-hydroxyalkyl isocyanurates by reacting cyanuric acid with less than twice the theoretical amount of an alkylene oxide containing 2 to 4 carbon atoms at temperature of about 25° to 140° C. in the presence of an inert solvent for the cyanuric acid and alkylene oxide and an alkaline catalyst. The tris-2-hydroxyalkyl isocyanurates, when heated at temperature of about 150° to 250° C., form 2-oxazolidone, 5-methyl-2-oxazolidone and 5-ethyl-2-oxazolidone, as disclosed in Little and Poon U.S. application Serial No. 848,215, filed October 23, 1959, now U.S. Patent 3,108,-115.

In accordance with our invention, an N-hydroxyalkyl substituted oxazolidone may be prepared in high yield by reacting cyanuric acid with an alkylene oxide containing 2 to 4 carbon atoms, in mol ratio of at least about 6 mols of the alkylene oxide per mol of cyanuric acid, at temperature of about 115° to 250° C. and in the presence of an inert solvent for the cyanuric acid and alkylene oxide.

The production of the N-hydroxyalkyl substituted oxazolidone may be represented by the following equation:

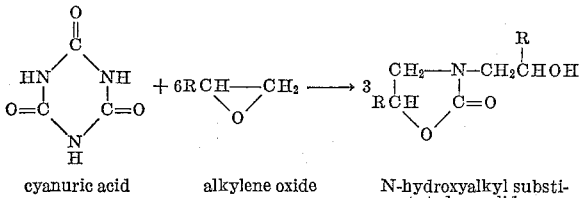

cyanuric acid    alkylene oxide    N-hydroxyalkyl substituted oxazolidone

In the equation, R is a member of the group consisting of hydrogen and alkyl radicals containing 1 to 2 carbon atoms.

In order to attain the desired results of this invention, the alkylene oxide and cyanuric acid are employed in ratio of at least about 6 mols, preferably about 6 to 9 mols, of alkylene oxide per mol of cyanuric acid. Ratio of more than 9 mols of alkylene oxide per mol of cyanuric acid may be used but tends to become uneconomical.

The cyanuric acid and alkylene oxide are reacted at temperature of about 115° to 250° C., preferably about 130° to 200° C. At the preferred temperatures, maximum yields of the N-hydroxyalkyl substituted oxazolidone product are realized. When reaction temperature below about 115° C. is employed, little or no formation of the product occurs. Moreover, if the temperature is raised above about 250° C. the product tends to decompose resulting in unacceptably low yields.

In conjunction with the reaction temperatures set forth above, substantially atmospheric pressure or superatmospheric pressure may be emloyed. It has been found convenient to carry out the reaction at autogenous pressure of the reactants. However, if desired, substantially atmospheric pressure may be used by adding the alkylene oxide gradually to the reaction mixture. The rate of alkylene oxide addition may be readily controlled by maintaining a slight reflux of alkylene oxide to the reaction vessel by means of a condenser.

Duration of the reaction is variable, the required time decreasing as the reaction temperature is increased. At the preferred temperature of about 130° to 200° C., the reaction is generally carried out for not more than about 2 hours in order to prevent the occurrence of undesirable side reactions. Longer reaction periods are suitable, however, when gradual addition of alkylene oxide is employed.

It is necessary to carry out the reaction in the presence of an inert solvent for both the cyanuric acid and alkylene oxide. Particularly outstanding results have been obtained using a solvent comprising a lower dialkylformamide (i.e., a dialkylformamide in which each of the alkyl radicals contains from 1 to 4 carbon atoms), preferably dimethylformamide. Other suitable solvents include N-alkyl morpholine and N-alkyl oxazolidone-2 in which the alkyl radical contains from 1 to 4 carbon atoms (e.g., N-methyl morpholine and N-methyl oxazolidone-2), N-methyl pyrrolidone, dimethyl sulfoxide, formamide, dimethyl acetamide and diethyl carbonate. The solvent may be suitably employed in weight ratio of about 0.5 to 20 parts per part of total reactants and preferably about 1 to 9 parts of solvent per part of total reactants. As the amount of solvent is increased, the reaction mass varies from a slurry to a complete solution.

It is preferred to use a small amount of an alkaline material, preferably an alkali metal hydroxide, in the reaction mixture to catalyze the reaction, especially at reaction temperatures below about 130° C. The presence of the alkaline material appears to increase the speed of the reaction, at least initially, but is not considered essential in the process because good results have been obtained without use of a catalyst.

Among the alkaline materials which may be used as catalyst are sodium hydroxide, potassium hydroxide, sodium carbonate, calcium hydroxide, tetramethyl ammonium hydroxide and tertiary aliphatic amines such as triethylamine and tripropylamine. Ordinarily, the catalyst is employed in an amount corresponding to from about 0.01% to about 0.5% by weight of total reactants.

To avoid the possibility of product decomposition, the solvent and unreacted alkylene oxide may be distilled from the reaction product at pressure below atmospheric. The pressure is not critical, but pot temperatures during solvent distillation should not exceed 250° C. The solvent and unreacted alkylene oxide may be recycled to the next batch, if desired.

Relatively pure N-hydroxyalkyl substituted oxazolidone is then distilled from the reaction product at low pressure, preferably at pressure of about 0.1 to 5 mm. of mercury. If greater purity is desired, the N-hydroxyalkyl substituted oxazolidone may be redistilled.

In preferred operation, an N-hydroxyalkyl substituted oxazolidone is prepared by reacting cyanuric acid with an alkylene oxide selected from the group consisting of ethylene oxide, propylene oxide and butylene oxide, in mol ratio of about 6 to 9 mols of alkylene oxide per mol of cyanuric acid. The reaction is carried out at temperature of about 130° to 200° C. in the presence of a lower dialkylformamide, e.g., dimethylformamide, as solvent and an alkali metal hydroxide as catalyst. The solvent is employed in weight ratio of about 1 to 9 parts per part of total reactants. After the reaction is complete, the solvent and unreacted alkylene oxide are distilled from the reaction product at pressure below atmospheric. Relatively pure N-hydroxyalkyl substituted oxazolidone product is then distilled from the reaction product at pressure of about 0.1 to 5 mm. of mercury. If desired, the N-hydroxyalkyl substituted oxazolidone may be purified by further distillation.

In order that those skilled in the art may understand how the present invention can be carried into effect, the following examples are given by way of illustration and not by way of limitation. All parts are by weight.

*Example 1*

A mixture of 13 parts of cyanuric acid, 39 parts of ethylene oxide and 0.2 part of sodium hydroxide was heated with 94 parts of dimethylformamide at 180°–202° C. for about 1 hour in a rocking autoclave. Dimethylformamide and unreacted ethylene oxide were then stripped from the reaction product at 70°–80° C. and 15 mm. mercury pressure. Vacuum distillation of the stripped product at about 1 mm. mercury pressure and temperature of 145°–165° C. yielded 28.5 parts of N-(2-hydroxyethyl)-oxazolidone-2, constituting a yield of 73% of theory based on the cyanuric acid fed.

Infrared spectrum showed the product to be identical to a sample of known N-(2-hydroxyethyl)-oxazolidone-2. The refractive index of the product was $n_D^{20}=1.482$ (literature 1.482).

*Example 2*

A mixture of 13 parts of cyanuric acid, 35 parts of propylene oxide and 0.2 part of sodium hydroxide was heated with 94 parts of dimethylformamide at 180°–200° C. for one hour in an autoclave provided with a stirrer. Dimethylformamide and unreacted propylene oxide were then stripped from the reaction product by heating on a steam bath at 15 mm. mercury pressure. The stripped product was then distilled at 123°–128° C. at about 0.1 mm. mercury pressure to give 26.5 parts of 5-methyl-N-(2-hydroxypropyl)-oxazolidone-2, constituting a yield of 55.6% of theory based on the cyanuric acid fed.

The infrared spectrum of the product was identical to that of a known sample of 5-methyl-N-(2-hydroxypropyl)-oxazolidone-2. The refractive index of the product was $n_D^{20}=1.469$ (literature 1.469).

*Example 3*

A mixture of 13 parts of cyanuric acid, 35 parts of propylene oxide and 94 parts of dimethylformamide was heated at 148°–182° C. for 2½ hours in an autoclave provided with a stirrer. Dimethylformamide and unreacted propylene oxide were then stripped from the reaction product by heating at about 82° C. at a pressure of 18 mm. mercury. The stripped product was then distilled at about 4 mm. mercury pressure. A small forecut distilled at an overhead temperature of 152° C. The main fraction consisting of 5-methyl-N-(2-hydroxypropyl)-oxazolidone-2 ($n_D^{20}=1.469$) distilled at about 170° C. to give 32 parts of relatively pure product. This constituted a yield of about 74% of theory based on the cyanuric acid fed.

*Example 4*

A mixture of 150 parts of cyanuric acid and 8 parts of sodium hydroxide in 1880 parts of dimethylformamide were placed in an autoclave provided with a stirrer and a reflux condenser. 458 parts of propylene oxide were then added over a period of 6½ hours. During addition of the propylene oxide, the reaction mixture was maintained between 130°–136° C. under reflux at atmospheric pressure. The mixture was heated at 135° C. for an additional ½ hour after all the propylene oxide was added. The mixture was then cooled and filtered to remove sodium hydroxide and traces of insoluble polymers. Dimethylformamide and unreacted propylene oxide were removed at 80°–90° C. at 18 mm. mercury pressure. The stripped product was then distilled at 140°–143° C. at 0.5 mm. mercury pressure to give 492 parts of 5-methyl-N-(2-hydroxypropyl)-oxazolidone-2, which represented a yield of 88.7% based on the cyanuric acid fed.

The N-hydroxyalkyl substituted oxazolidones of the present invention may be used as precursors for preparation of vinyl oxazolidones. The vinyl oxazolidones and certain of their derivatives constitute valuable intermediates and agents for dyestuffs, textile assistants, plastics and as dye receptors. The N-hydroxyalkyl substituted oxazolidones also find utility for regulating plant growth and for separation of aliphatic-aromatic hydrocarbon mixtures.

Since various changes and modifications may be made in the invention without departing from the spirit thereof, the invention is deemed to be limited only by the scope of the appended claims.

We claim:
1. A process of preparing an N-hydroxyalkyl substituted oxazolidone having the formula:

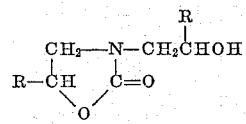

wherein R is a member of the group consisting of hydrogen, methyl and ethyl which comprises reacting cyanuric acid with an alkylene oxide selected from the group consisting of ethylene oxide, propylene oxide and butylene oxide, in mol ratio of at least 6 mols of alkylene oxide per mol of cyanuric acid, at temperature of about 115° to 250° C. in the presence of an inert solvent for the cyanuric acid and alkylene oxide, and recovering the N-hydroxyalkyl substituted oxazolidone from the resultant reaction product.

2. A process of preparing an N-hydroxyalkyl substituted oxazolidone having the formula:

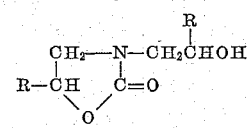

wherein R is a member of the group consisting of hydrogen, methyl and ethyl which comprises reacting cyanuric acid with an alkylene oxide selected from the group consisting of ethylene oxide, propylene oxide and butylene oxide, in mol ratio of at least 6 mols of alkylene oxide per mol of cyanuric acid, at temperature of about 130° to 200° C. in the presence of an inert solvent for the cyanuric acid and alkylene oxide, and recovering the N-hydroxyalkyl substituted oxazolidone from the resultant reaction product.

3. A process of preparing an N-hydroxyalkyl substituted oxazolidone having the formula.

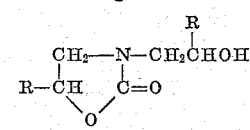

wherein R is a member of the group consisting of hydrogen, methyl and ethyl which comprises reacting cyanuric acid with an alkylene oxide selected from the group consisting of ethylene oxide, propylene oxide and butylene oxide, in mol ratio of 6 to 9 mols of alkylene oxide per mol of cyanuric acid, at temperature of about 130° to 200° C. in the presence of an inert solvent for the cyanuric acid and alkylene oxide, and recovering the N-hydroxyalkyl substituted oxazolidone from the resultant reaction product.

4. A process of preparing an N-hydroxyalkyl substituted oxazolidone having the following formula:

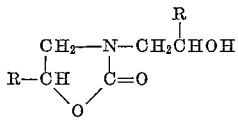

wherein R is a member of the group consisting of hydrogen, methyl and ethyl which comprises reacting cyanuric acid with an alkylene oxide selected from the group consisting of ethylene oxide, propylene oxide and butylene oxide, in mol ratio of 6 to 9 mols of alkylene oxide per mol of cyanuric acid, at temperature of about 130° to 200° C. in the presence of an inert solvent for the cyanuric acid and alkylene oxide, and distilling the resultant reaction product at low pressure to recover the N-hydroxyalkyl substituted oxazolidone.

5. A process of preparing an N-hydroxyalkyl substituted oxazolidone having the following formula:

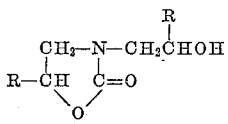

wherein R is a member of the group consisting of hydrogen, methyl and ethyl which comprises reacting cyanuric acid with an alkylene oxide selected from the group consisting of ethylene oxide, propylene oxide and butylene oxide, in mol ratio of 6 to 9 mols of alkylene oxide per mol of cyanuric acid, at temperature of about 130° to 200° C. in the presence of an inert solvent for the cyanuric acid and alkylene oxide and an alkaline catalyst, and distilling the resultant reaction product at low pressure to recover the N-hydroxyalkyl substituted oxazolidone.

6. A process of preparing an N-hydroxyalkyl substituted oxazolidone having the following formula:

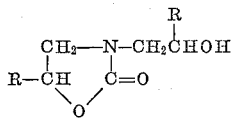

wherein R is a member of the group consisting of hydrogen, methyl and ethyl which comprises reacting cyanuric acid with an alkylene oxide selected from the group consisting of ethylene oxide, propylene oxide and butylene oxide, in mol ratio of 6 to 9 mols of alkylene oxide per mol of cyanuric acid, at temperature of about 130° to 200° C. in the presence of a lower dialkylformamide as solvent and an alkaline catalyst, and distilling the resultant reaction product at low pressure to recover the N-hydroxyalkyl substituted oxazolidone.

7. A process of preparing N-(2-hydroxyethyl)-oxazolidone-2 which comprises reacting cyanuric acid with ethylene oxide, in mol ratio of 6 to 9 mols of ethylene oxide per mol of cyanuric acid, at temperature of about 130° to 200° C. in the presence of a lower dialkylformamide as solvent and an alkaline catalyst, and distilling the resultant reaction product at low pressure to recover N-(2-hydroxyethyl)-oxazolidone-2.

8. A process of preparing 5-methyl-N-(2-hydroxypropyl)-oxazolidone-2 which comprises reacting cyanuric acid with propylene oxide, in mol ratio of 6 to 9 mols of propylene oxide per mol of cyanuric acid, at temperature of about 130° to 200° C. in the presence of a lower dialkylformamide as solvent and an alkaline catalyst, and distilling the resultant reaction product at low pressure to recover 5-methyl-N-(2-hydroxypropyl)-oxazolidone-2.

9. A process of preparing N-(2-hydroxyethyl)-oxazolidone-2 which comprises reacting cyanuric acid with ethylene oxide, in mol ratio of 6 to 9 mols of ethylene oxide per mol of cyanuric acid, at temperature of about 130° to 200° C. in the presence of dimethylformamide as solvent and an alkali metal hydroxide as catalyst, and distilling the resultant reaction product at low pressure to recover N-(2-hydroxyethyl)-oxazolidone-2.

10. A process of preparing 5-methyl-N-(2-hydroxypropyl)-oxazolidone-2 which comprises reacting cyanuric acid with propylene oxide, in mol ratio of 6 to 9 mols of propylene oxide per mol of cyanuric acid, at temperature of about 130° to 200° C. in the presence of dimethylformamide as solvent and an alkali metal hydroxide as catalyst, and distilling the resultant reaction product at low pressure to recover 5-methyl-N-(2-hydroxypropyl)-oxazolidone-2.

References Cited by the Examiner

UNITED STATES PATENTS

| | | | |
|---|---|---|---|
| 2,629,740 | 2/53 | Carnes | 260—307.6 |
| 2,706,194 | 4/55 | Morris et al. | 260—248 |
| 2,716,137 | 8/55 | Patton | 260—248 |
| 2,809,942 | 10/57 | Cooke | 260—248 |
| 2,977,369 | 3/61 | Dixon et al. | 260—307.3 |
| 2,977,370 | 3/61 | Oken | 260—307.3 |
| 2,977,371 | 3/61 | Dixon | 260—307.3 |
| 3,020,262 | 2/62 | Speranza | 260—307.3 |
| 3,088,948 | 5/63 | Little et al. | 260—248 |
| 3,108,115 | 10/63 | Little et al. | 260—307.3 |

FOREIGN PATENTS

| | | |
|---|---|---|
| 118,142 | 2/59 | Russia. |

OTHER REFERENCES

Allied Chemical Product Bulletin, Cyanuric Acid, May 1959, page 4.

Chem. Abst., vol. 33, col. 21673 (1959).

Elderfield, "Heterocyclic Compounds," vol. 5, pages 397–8 (1957).

Jones et al., J. Chem. Soc. pp. 4392–4 (1957).

MacArdle, "Solvents in Syn. Org. Chem." (Van Nostrand), pp. 1–3 (1925).

Speranza et al., J. Org. Chem., vol. 23, pp. 1922–4 (December 1955).

NICHOLAS S. RIZZO, *Primary Examiner.*

IRVING MARCUS, DUVAL McCUTCHEN, WALTER MODANCE, *Examiners.*